April 30, 1946.  S. S. MOORE  2,399,284
STABILIZER
Filed May 1, 1944  2 Sheets-Sheet 1

Inventor
Stanley S. Moore
By
Webster & Webster
Attorney

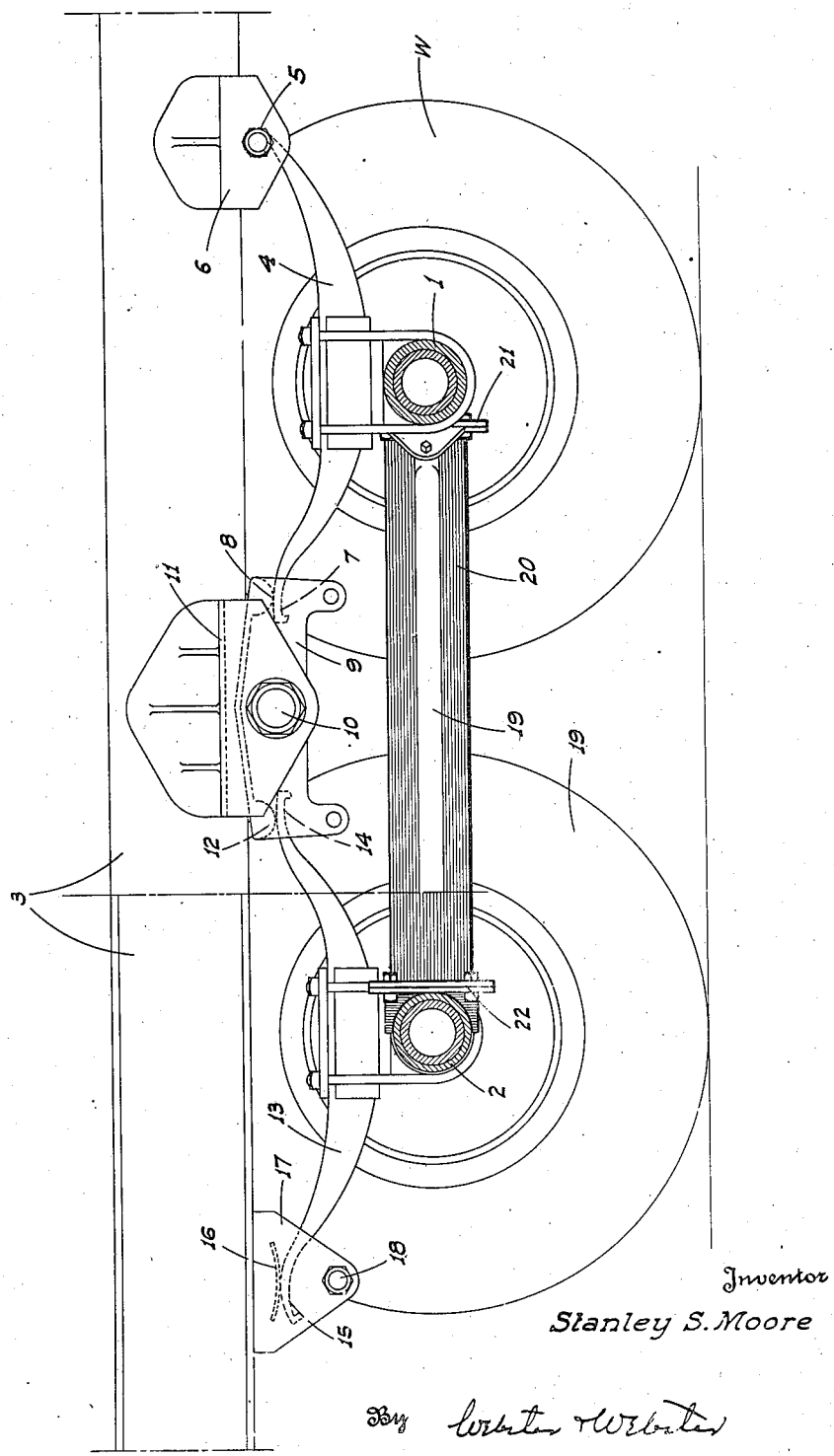

Patented Apr. 30, 1946

2,399,284

UNITED STATES PATENT OFFICE 2,399,284

STABILIZER

Stanley S. Moore, Stockton, Calif.

Application May 1, 1944, Serial No. 533,549

11 Claims. (Cl. 280—104)

In dual axle assemblies for the rear of rubber tired trucks, the leading and trailing wheel supporting axles are commonly separately spring-suspended, except for draft or drag links connecting the same. However, by reason of such relative independent mounting of the dual axles, the wheels tend to chatter when the brakes are simultaneously applied to said wheels.

It is therefore one of the objects of this invention to provide a novel stabilizer for such a dual axle assembly; the stabilizer being operative to resist relative movement of the axles in a transverse vertical plane, and consequently to prevent chattering of the wheels when the brakes are applied.

Another object of this invention is to provide a stabilizer, as above, which, while being operative to resist or dampen relative movement of the axles in a transverse vertical plane, nevertheless permits independent vertical movement of the wheels due to road shock or the like.

It is also an object of this invention to provide a stabilizer for the purpose described which comprises, in unitary relation, a pair of relatively long and flat leaf springs disposed in adjacent transversely spaced relation and on edge vertically; said spring being rigidly connected between the leading and trailing axles centrally between the ends of the same, whereby relative movement of said leading and trailing axles in a transverse vertical plane is effectively independently resisted by the torque of said spring unit.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a sectional elevation on line 2—2 of Fig. 1.

Figure 1:
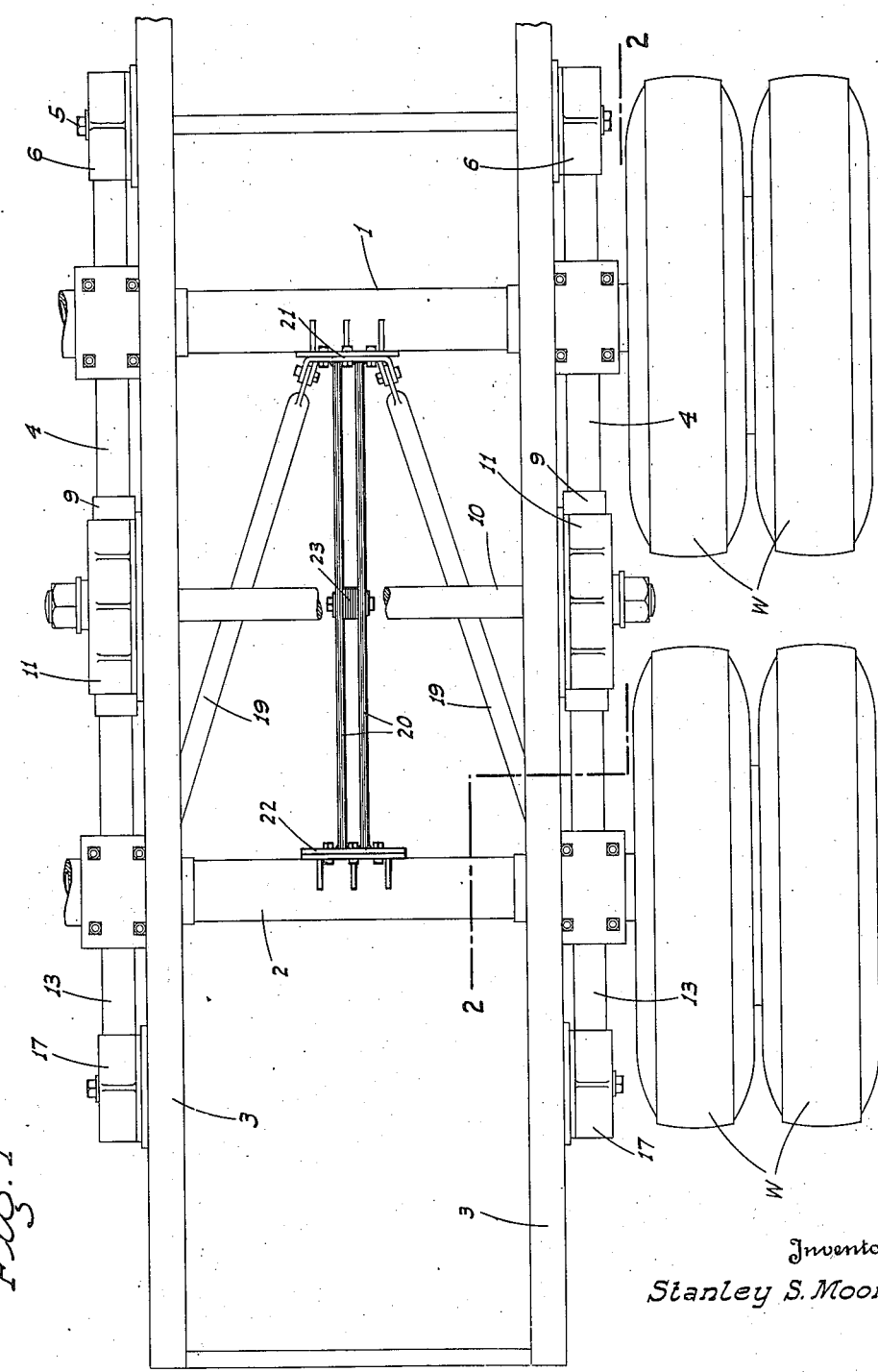
Figure 1 is a plan view of a dual axle assembly embodying the present invention.

Referring now more particularly to the characters of reference on the drawings, the dual axle assembly, which is of substantially conventional construction, comprises a pair of substantially parallel cross members consisting of a leading axle 1 and a trailing axle 2, supported by wheels W and disposed in spaced relation lengthwise of the truck frame 3. The leading axle 1 is suspended from a pair of transversely spaced semi-elliptical spring units 4, and said spring units are formed at their forward ends with an eye 5 secured to a frame bracket 6 fixed in connection with the corresponding side of frame 3. At their other or rear ends 7 the spring units 4 slidably abut from below against a corresponding pad 8 of a rocker assembly, which includes pad carrying rockers 9 fixed on a cross shaft 10 suspended by a bracket 11 from the frame.

At the end opposite the pad 8 the rockers 9 include another pad 12. The rear axle 2 of the dual axle assembly is suspended from transversely spaced semi-elliptical spring units 13 whose forward ends 14 slidably engage the pads 12 from beneath. The rear ends 15 of the spring units 13 engage other and corresponding pads 16 fixed in connection with the sides of frame 3 rearwardly of axle 2. The pads 16 are carried in a bracket which includes transversely spaced bracket plates 17 and a cross bolt 18 which limits downward movement of the adjacent end 15 of the corresponding spring 13.

A pair of draft or drag links 19 are pivotally connected at their forward ends to the leading axle 1 adjacent the center thereof, and said links diverge rearwardly to pivotal connection with the trailing axle 2. It will thus be seen that except for the drag links 19 the rear axle 2 is separately and independently suspended relative to the leading axle 1. The above arrangement is conventional and, due to said independent mounting of the axles, there is a tendency of the wheels to chatter when the brakes are applied.

To prevent this chattering, and to otherwise stabilize the axles of the assembly, the following arrangement is provided:

A pair of elongated relatively wide flat or leaf springs 20 are disposed in closely adjacent but transversely spaced relation and on edge vertically; said leaf spring unit extending lengthwise of the truck centrally between the ends of the axles. At the ends of springs 20 the same are fixedly connected to attachment brackets 21 and 22, which are in turn rigidly secured to the leading and trailing axles respectively. A spacer 23 is secured between the springs 20 centrally between the ends thereof.

With the above described stabilizer it will be evident that when the brakes are applied to the wheels W of the dual axle assembly, any tendency of said wheels to chatter, which would result in relative movement of the axles in a transverse vertical plane, is effectively resisted by the springs 20, as any torque imparted thereto tends to return the wheels to the ground.

While the springs 20 effectively stabilize the dual axle assembly, they do not of course limit oscillation of the wheels resulting from road shock or the like.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A stabilizer for a vehicle axle assembly having a wheel supporting axle movable vertically relative to a cross member spaced therefrom lengthwise of the direction of travel, said stabilizer comprising a torque spring extending between said axle and cross member, and means rigidly connecting said spring at adjacent ends to said axle and cross member.

2. A stabilizer for a vehicle axle assembly having a wheel supporting axle movable vertically relative to a cross member spaced therefrom lengthwise of the direction of travel, said stabilizer comprising a torque spring extending between said axle and cross member, and means rigidly connecting said spring at adjacent ends to said axle and cross member; said spring comprising an elongated, relatively wide flat leaf spring.

3. A stabilizer for a vehicle axle assembly having a wheel supporting axle movable vertically relative to a cross member spaced therefrom lengthwise of the direction of travel, said stabilizer comprising a torque spring extending between said axle and cross member, and means rigidly connecting said spring at adjacent ends to said axle and cross member; said spring comprising an elongated, relatively wide flat leaf spring, said leaf spring being disposed vertically on edge.

4. A stabilizer for a dual axle assembly for vehicles, said assembly having relatively vertically movable wheel supporting axles spaced apart lengthwise of the direction of travel, said stabilizer comprising a torque spring extending between said axles, and means rigidly connecting said spring at the ends to corresponding axles.

5. A stabilizer for a dual axle assembly for vehicles, said assembly having relatively vertically movable wheel supporting axles spaced apart lengthwise of the direction of travel, said stabilizer comprising a torque spring extending between said axles, and means rigidly connecting said spring at the ends to corresponding axles; said torque spring comprising an elongated, relatively wide flat leaf spring.

6. A stabilizer for a dual axle assembly for vehicles, said assembly having relatively vertically movable wheel supporting axles spaced apart lengthwise of the direction of travel, said stabilizer comprising a torque spring extending between said axles, and means rigidly connecting said spring at the ends to corresponding axles; said torque spring comprising an elongated, relatively wide flat leaf spring, said flat leaf spring being disposed vertically on edge.

7. A stabilizer for a dual axle assembly for vehicles, said assembly having relatively vertically movable wheel supporting axles spaced apart lengthwise of the direction of travel, said stabilizer comprising a pair of elongated leaf springs disposed in spaced facing relation and extending between the axles, and means rigidly connecting said springs at their ends to each other and to their corresponding axles.

8. A stabilizer for a dual axle assembly for vehicles, said assembly having relatively vertically movable wheel supporting axles spaced apart lengthwise of the direction of travel, said stabilizer comprising a pair of elongated leaf springs disposed in spaced facing relation and extending between the axles, and means rigidly connecting said springs at their ends to each other and to their corresponding axles; said leaf springs being parallel to each other and disposed vertically on edge.

9. A stabilizer as in claim 8 including a spacer block disposed between said springs intermediate their ends, and means connecting the block to said springs.

10. A stabilizer as in claim 8 in which said springs are connected to the axles adjacent and in symmetrical relation to the longitudinal center line of the axle assembly.

11. In combination, a vehicle body, a pair of wheel supporting axles spaced apart in the direction of travel of the vehicle, springs on one axle supporting the vehicle body, said springs being pivotally connected to the body on at least one end, springs on the other axle and supporting the vehicle body but being disconnected therefrom whereby there is but sliding frictional contact between the body and springs, reach rods pivotally connecting the first axle to the second axle, and a torque spring interposed between and rigidly connected to both axles and functioning to prevent relative fore and aft movement of said axles, or relative vertical movement thereof in a straight vertical plane.

STANLEY S. MOORE.